US009170672B2

(12) United States Patent
Shenfield (10) Patent No.: US 9,170,672 B2
(45) Date of Patent: Oct. 27, 2015

(54) PORTABLE ELECTRONIC DEVICE WITH A TOUCH-SENSITIVE DISPLAY AND NAVIGATION DEVICE AND METHOD (71) Applicant: BLACKBERRY LIMITED, Waterloo (CA)

(72) Inventor: Alon Shenfield, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/476,493

(22) Filed: Sep. 3, 2014

(65) Prior Publication Data
US 2014/0368457 A1 Dec. 18, 2014

Related U.S. Application Data (63) Continuation of application No. 12/837,845, filed on Jul. 16, 2010, now Pat. No. 8,854,316.

(51) Int. Cl.
G06F 3/041 (2006.01)
G06F 3/045 (2006.01)
G06F 3/048 (2013.01)
G06F 3/0481 (2013.01)
G06F 3/0485 (2013.01)
G06F 3/0488 (2013.01)

(52) U.S. Cl.
CPC ............ *G06F 3/041* (2013.01); *G06F 3/0481* (2013.01); *G06F 3/0485* (2013.01); *G06F 3/04883* (2013.01)

(58) Field of Classification Search
CPC ... G06F 3/0481; G06F 3/041; G06F 3/04883; G06F 3/0485
See application file for complete search history.

(56) References Cited

U.S. PATENT DOCUMENTS

| 6,037,929 A | 3/2000 | Ogura et al. |
| 2005/0275637 A1 | 12/2005 | Hinckley et al. |
| 2006/0044259 A1 | 3/2006 | Hotelling et al. |
| 2009/0295753 A1* | 12/2009 | King et al. .................. 345/174 |
| 2010/0088641 A1* | 4/2010 | Choi ............................ 715/828 |
| 2010/0139990 A1 | 6/2010 | Westerman et al. |

FOREIGN PATENT DOCUMENTS

| CA | 2647345 A1 | 7/2009 |
| CA | 2677583 A1 | 3/2010 |
| EP | 2077490 A | 7/2009 |
| TW | 200912612 A | 3/2009 |

OTHER PUBLICATIONS

EESR dated May 12, 2011, issued in respect of corresponding European Patent Application No. 10169910.6.
Examiner's Report dated Nov. 4, 2013, issued in respect of corresponding Canadian Patent Application No. 2,770,132.
(Continued)

*Primary Examiner* — Charles V Hicks
(74) *Attorney, Agent, or Firm* — Geoffrey deKleine; Borden Ladner Gervais LLP (57) ABSTRACT A method includes detecting a touch at a location on a touch-sensitive display, receiving an input by a navigation device, and performing a function associated with at least one of the touch and the input in response to elapsing of a time period between detecting the touch and receiving the input.

11 Claims, 5 Drawing Sheets (56) References Cited

OTHER PUBLICATIONS

English translation of Office Action dated Dec. 27, 2013, issued in respect of corresponding Taiwan Patent Application No. 100121319.
Office Action dated Apr. 1, 2014, issued in respect of corresponding Korean Patent Application No. 10-2013-7000914 (English translation not available).

Office Action dated Sep. 26, 2014, issued in respect of corresponding Korean Patent Application No. 10-2013-7000914 (English translation not available).
Examiner's Report dated Sep. 8, 2014, issued in respect of corresponding Canadian Patent Application No. 2,770,132.

* cited by examiner

PORTABLE ELECTRONIC DEVICE WITH A TOUCH-SENSITIVE DISPLAY AND NAVIGATION DEVICE AND METHOD

FIELD OF TECHNOLOGY

The present disclosure relates to electronic devices including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 702.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed.

Improvements in devices with touch-sensitive displays are desirable.

DETAILED DESCRIPTION

The following describes an electronic device and method including detecting a touch at a location on a touch-sensitive display, receiving an input by a navigation device, and performing a function associated with at least one of the touch and the input in response to elapsing of a time period between detecting the touch and receiving the input.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

Figure 1:
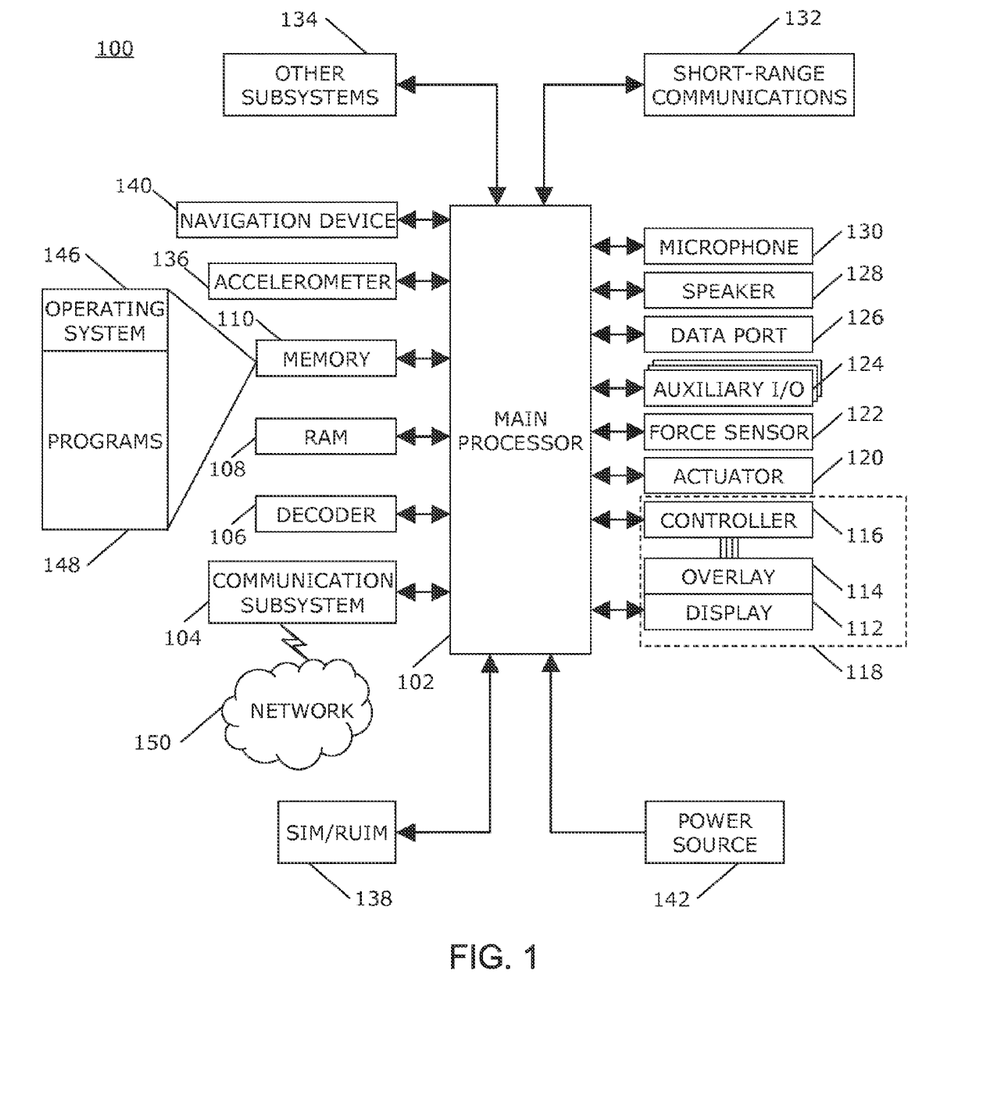
FIG. 1 is a block diagram of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces. Optionally, the processor 102 may interact with one or more actuators 120 and/or one or more force sensors 122.

The processor 102 also interacts with a navigation device 140 that may be, for example, a touch-sensitive track pad, a trackball, an optical joystick, and so forth, to interface with a user to provide input. The navigation device 140 may be utilized, for example, to navigate through information on a display, control a cursor or other indicator, edit information, and so forth. In the examples shown, the navigation device 140 is located near the touch-sensitive display 118. "Input" as utilized hereinafter refers to gestures or other contact applied to the navigation device 140 or the interpretation of the gesture or contact by the navigation device 140.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 receives touch data, including a location of a touch. Touch data may include an area of contact or a single point of contact, such as a point at or near a center of the area of contact. A signal is provided to the controller 116 in response to detection of a touch. A touch may be detected from any suitable object, such as a finger, thumb or appendage. The controller 116 and/or the processor 102 may detect a touch by any suitable contact member on the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 that begins at an origin point and continues to a finishing point. A gesture may be long or short in distance and/or duration. Two points of the gesture may be utilized to determine a direction of the gesture.

The optional actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

The optional force sensor(s) 122 may provide force information related to a detected touch. The force information may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock" function buttons, such as play or stop on a music player; and so forth. Different magnitudes of force may be associated with different functions or input. For example, a lesser force may result in panning, and a higher force may result in zooming.

Figure 2:
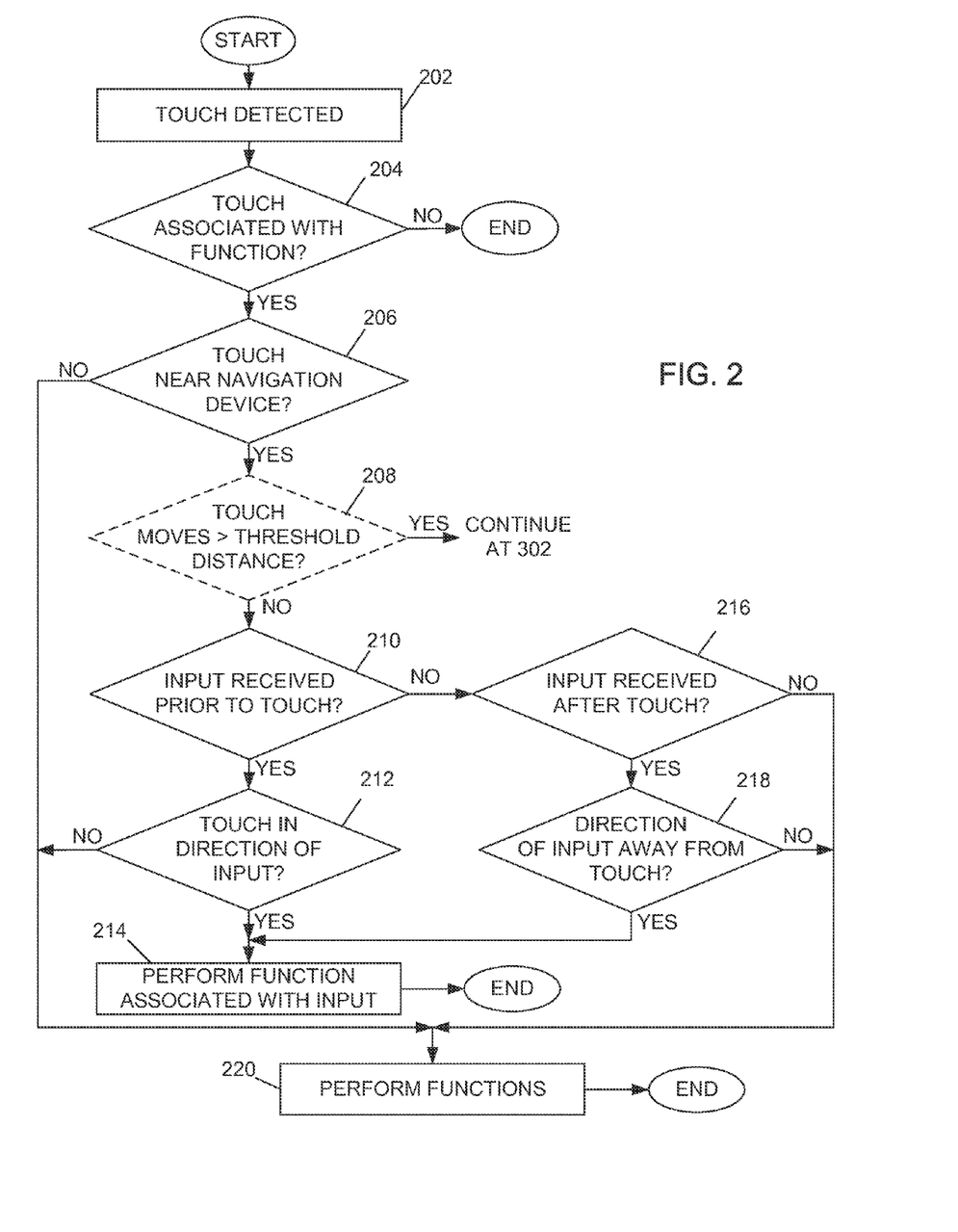
FIG. 2 and FIG. 3 combined are a flowchart illustrating a method of selecting functions to perform on an electronic device in accordance with the present disclosure.
Figure 3:
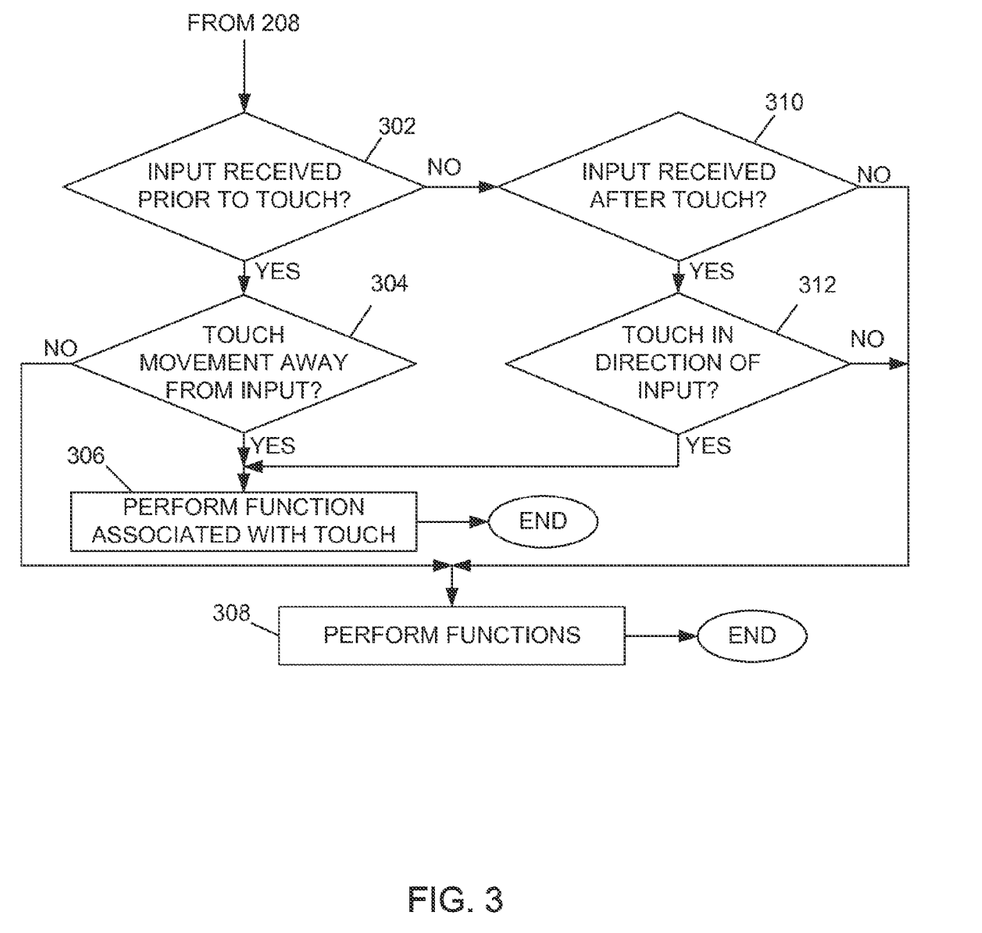

A flowchart illustrating a method of selecting functions to perform by an electronic device, such as the portable electronic device 100, is shown in FIG. 2 and FIG. 3. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order. A computer-readable medium that has computer-readable code may be executable by at least the processor 102 to perform the method. The process may be carried out in on any displayed screen, such as a home screen, preferences menu, any suitable application, such as, email, text messaging, calendar, tasks, or address book, or any other suitable application, in which a user may navigate and/or make selections, for example, a list, a document, an index, a menu, and so forth.

A touch is detected 202 that is associated with a function. The touch may be associated with a function when, for example, the touch location is associated with a selectable feature, such as a key, box, or menu item, displayed on the touch-sensitive display 118. When the touch location is near 204 the navigation device 140, the process continues at 206. The touch location is near the navigation device 140, for example, when the touch location is within a predetermined distance of the navigation device 140, at a predetermined area of the touch-sensitive display 118, or within a predetermined distance, e.g., within 5 mm, of the edge of the touch-sensitive display 118 closest to the navigation device 140. When the touch location is not near 204 the navigation device 140, the process continues at 218.

Optionally, when the touch moves a distance that is greater than a threshold distance at 208, the process continues at 220 of FIG. 3. A gesture on the touch-sensitive display 118 extends a distance that is greater than a threshold distance that may be, for example, a value that is one quarter to half the length of the touch-sensitive display 118, another suitable value such as 2 cm to 7 cm, a user-selected value stored in a user profile, or any other suitable value. For example, a long gesture on the touch-sensitive display may result in an inadvertent touch on the navigation device 140. Input from the navigation device 140 may be filtered out, i.e., the function associated with the input is not performed, based on the distance of movement of the touch on the touch-sensitive display 118. When the touch does not move a distance that is greater than the threshold distance at 206, or when the distance of the touch moving is not considered, the process continues at 208.

When input from the navigation device 140 is received within a predetermined time period prior to detecting the touch at 208, the process continues at 210. When input from the navigation device 140 is not received within a predetermined time period prior to detecting the touch at 208, the process continues at 214. The time period may be any suitable time period, e.g., 30 ms. In this example, when input from the navigation device 140 is received more than 30 ms before detecting the touch on the touch-sensitive display 118 and is not received during the 30 ms period, the process continues at 214.

When the direction of the input to the navigation device 140 is toward the touch at 210, the process continues at 212. The function associated with the input is performed at 212, and the process continues at 202. The data from the touch on the touch-sensitive display 118 is not utilized and the function associated with the touch is not performed. The function associated with the input may be, for example, a scrolling function, a selection function or any other suitable function. When the direction of the input to the navigation device 140 is not toward the touch at 210, the process continues at 218. A direction of input from the navigation device 140 is toward the touch, for example, when a scrolling or swiping input on the navigation device 140 is in the direction of the touch-sensitive display 118, which direction may be directly toward or at an angle toward the touch location on the touch-sensitive display 118.

The function associated with the touch is performed, and, the function associated with the input is also performed 218, if an input was detected.

When input from the navigation device 140 is received within a predetermined time period after detecting the touch at 214, the process continues at 216. When input from the navigation device 140 is not received within the time period after detecting the touch at 214, the process continues at 218. Instead of performing the function associated with the touch, the processor 102 waits for the time period to elapse, for example, by setting a timer to wait for input from the navigation device 140. The time period is short in duration, e.g., 30 milliseconds, or another time period to avoid unnecessary delays to the user. The user may optionally set the delay that may be stored in a user profile. The time period may be equal to or may differ from the time period between receiving input from the navigation device 140 and detecting the touch at 208.

When the input from the navigation device 140 is in a direction away from the touch on the touch-sensitive display 118 at 216, the process continues at 212. When the input from the navigation device 140 is not in a direction away from the touch on the touch-sensitive display 118 at 216, the process continues at 218. The input from the navigation device 140 is in a direction away from the touch when the input from the navigation device 140 is in the direction away from the touch-sensitive display 118, which direction may be directly away from or at an angle away from the touch location on the touch-sensitive display 118.

As described above, touches on the touch-sensitive display 118 may be evaluated to identify which associated functions to perform based on the touch and the input received prior to or after the touch. Navigation device 140 input may also be evaluated based on the touch and the input.

When input from the navigation device 140 is received within a predetermined time period prior to detecting the touch at 220, the process continues at 222. When input from the navigation device 140 is not received within the predetermined time period prior to detecting the touch 220, the process continues at 228. The time period may be any suitable time period, e.g., 30 milliseconds. In this example, when input from the navigation device 140 is received more than 30 ms before detecting the touch on the touch-sensitive display 118 and is not received during the 30 ms period, the process continues at 228.

When the movement of the touch along the touch-sensitive display 118 is in a direction away from the navigation device 140 at 222, the process continues at 224. The function associated with the touch is performed at 224, and the process continues at 202. The input from the navigation device 140 is not utilized, and the function associated with the input is not performed. When the movement of the touch on the touch-sensitive display 118 is not in a direction away from the navigation device 140 at 222, the process continues at 226. The movement of the touch may be in the direction away from the navigation device 140 when the touch is, for example, a gesture on the touch-sensitive display 118, which direction may be directly away from or at an angle away from the navigation device 140.

The function associated with the touch is performed and, the function associated with the input is also performed 226, if an input was detected.

When input from the navigation device 140 is received within a predetermined time period after detecting the touch at 228, the process continues at 230. When input from the navigation device 140 is not received after detecting the touch and within the time period at 214, the process continues at 226.

When the movement of the touch is in the direction of the navigation device 140 at 230, the process continues at 224. When the movement of the touch is not in the direction of the navigation device 140 at 230, the process continues at 226.

The above process identifies which functions to perform, whether from a navigation device 140, a touch-sensitive display 118, or both, effectively disambiguating between touch data and navigation input, and at times, discarding either the input or the touch data. Although navigation input may be discarded based on the distance of movement of the touch on the touch-sensitive display 118, the navigation input or touch may be discarded based on any other suitable factor. For example, the navigation input may be discarded or not processed based on time duration of a touch and/or time duration of input. Alternatively, all navigation device input may be utilized and associated functions performed. Touch information may be discarded based on other factors than described in the flowchart.

Examples of touch gestures and navigation input on a portable electronic device 100 are illustrated in FIG. 4 through FIG. 11. In the examples of FIG. 4 through FIG. 11, the navigation device 140 is an optical track pad that is located near one end of the touch-sensitive display 118. Although the examples are simplified in that the direction of the touch or input is straight vertically with respect to the drawing, the method may be successfully applied when the direction is at an angle, curved, zigzag, and so forth.

A gesture across the navigation device 140 may be utilized, for example, to scroll through displayed information, such as a list of email messages. For example, a gesture in a direction away from the touch-sensitive display 118 scrolls downwardly through the information, and a gesture in a direction toward the touch-sensitive display 118 scrolls upwardly through the information. For example, when scrolling quickly, a user may inadvertently touch the touch-sensitive display 118, either before scrolling utilizing the navigation device 140 or after scrolling utilizing the navigation device 140, depending on the direction of scrolling.

Figure 4:
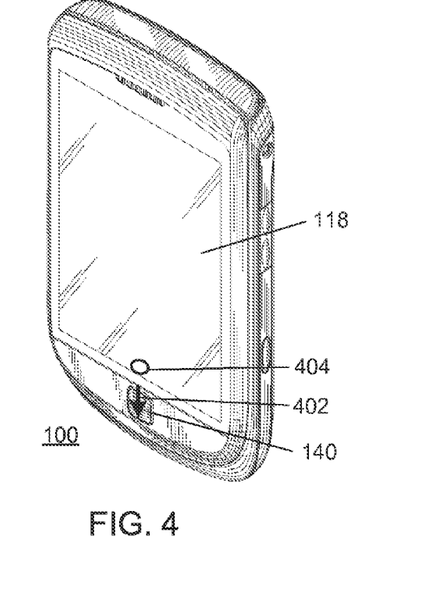
FIG. 4 through FIG. 11 illustrate examples of touches and input to an electronic device in accordance with the disclosure.

An example of a gesture along the navigation device 140 is illustrated by the arrow 402, which originates at a touch location on the touch-sensitive display 118 as illustrated by the ellipse 404 in FIG. 4. A touch is detected at the touch location 404 on the touch-sensitive display 118. The touch is associated with a selectable feature, e.g., an email message, and is within a predetermined distance, for example, 10 mm, of the edge of the touch-sensitive display 118 closest to the navigation device 140. The touch on the touch-sensitive display 118 is a short touch in both duration and distance. Input from the navigation device 140 was received within 15 ms prior to detecting the touch and is a gesture in the direction of the touch location 404. The list is scrolled based on the navigation device input. An email message associated with the touch is not selected.

Figure 5:
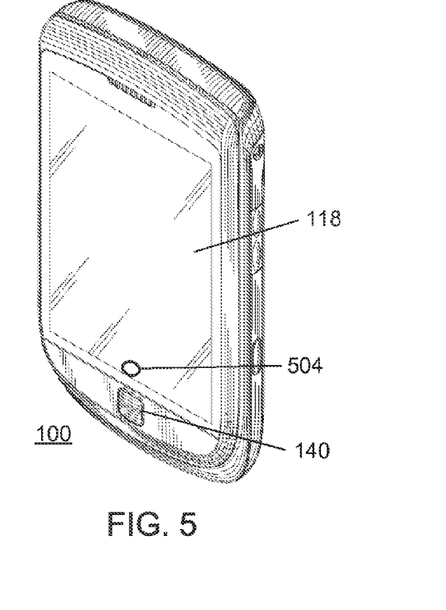

An example of a touch location on the touch-sensitive display 118 is illustrated by the ellipse 504 in FIG. 5. A touch is detected at the touch location 504 on the touch-sensitive display 118. The touch is associated with a selectable email message and is within a predetermined distance, for example, 10 mm, of the edge of the touch-sensitive display 118 closest to the navigation device 140. The time between input from the navigation device 140 and detecting the touch is greater than the predetermined time period, and the function associated with the touch location is performed. The email message is selected and opened.

Figure 6:
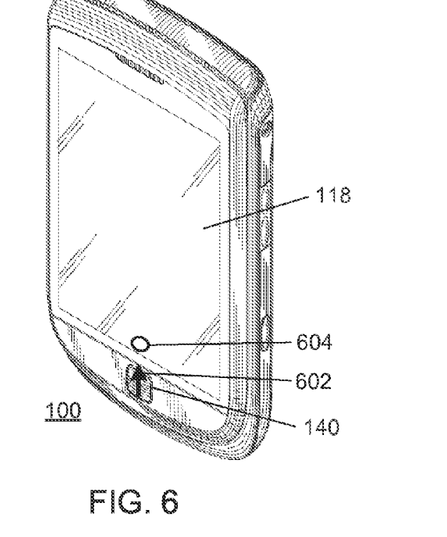

An example of a gesture along the navigation device 140 is illustrated by the arrow 602, which continues along the device 100 until a touch location on the touch-sensitive display 118 as illustrated by the ellipse 604 in FIG. 6. A touch is detected at the touch location 604 on the touch-sensitive display 118. The touch is associated with a selectable email message and is within a predetermined distance, for example, 10 mm, of the edge of the touch-sensitive display 118 closest to the navigation device 140. Input from the navigation device 140 is received within 15 ms of detecting the touch and is a gesture in the direction toward the touch location 604. The list is scrolled based on the navigation device input. An email message associated with the touch is not selected.

Figure 7:
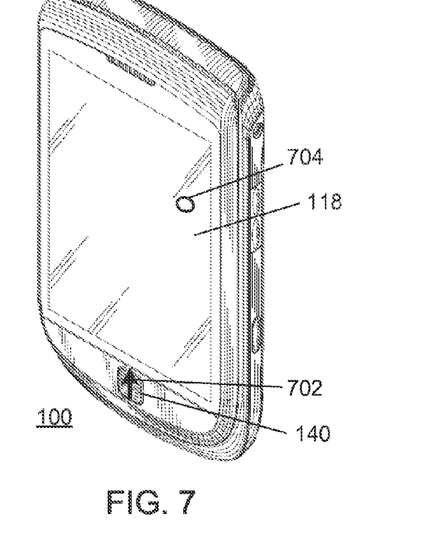

An example of a gesture along the navigation device 140 is illustrated by the arrow 702 in FIG. 7. A touch is detected at the touch location 704 on the touch-sensitive display 118. The touch is at a location associated with a selectable email message, which location is not within the predetermined distance of the edge of the touch-sensitive display 118 closest to the navigation device 140. The list is scrolled and the email message that is associated with the touch is selected and opened.

A gesture on the touch-sensitive display 118 may be utilized, for example, to scroll through displayed information, such as a list of email messages. For example, a gesture in a direction away from the navigation device 140 scrolls downwardly through the information, and a gesture in a direction toward the navigation device 140 scrolls upwardly through the information. For example, when scrolling quickly, a user may inadvertently touch the input or navigation device 140, either before scrolling or after scrolling, depending on the direction of scrolling.

Figure 8:
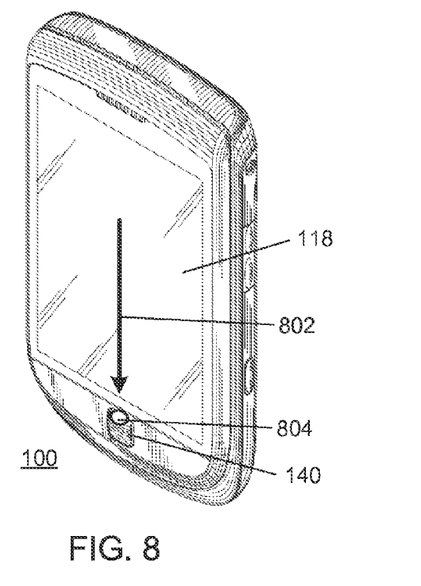

An example of a touch gesture on the touch-sensitive display 118 is illustrated by the arrow 802 and is followed by an input utilizing the navigation device 140 as illustrated by the ellipse 804 in FIG. 8. The touch on the touch-sensitive display 118 extends more than half of the touch-sensitive display 118. Input from the navigation device 140 was received within 15 ms prior to detecting the touch, and the touch is not in a direction away from the navigation device 140. Functions associated with both the touch and the input are performed. For example, scrolling may performed based on the touch on the touch-sensitive display 118, and a selection may be made based on the input from the navigation device 140.

Figure 9:
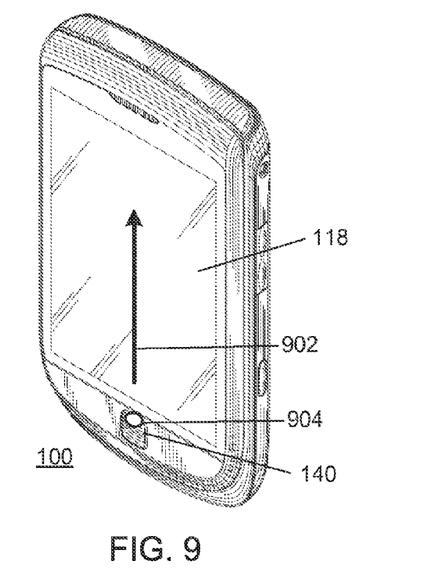

An example of a touch gesture on the touch-sensitive display 118 is illustrated by the arrow 902 and originates as an input utilizing the navigation device 140 as illustrated by the ellipse 904 in FIG. 9. The touch on the touch-sensitive display 118 extends more than half the length of the touch-sensitive display 118. Input from the navigation device 140 was received within 15 ms prior to detecting the touch, and the touch is in a direction away from the navigation device 140. A function associated with the touch is performed. A function associated with the input is not performed.

Figure 10:
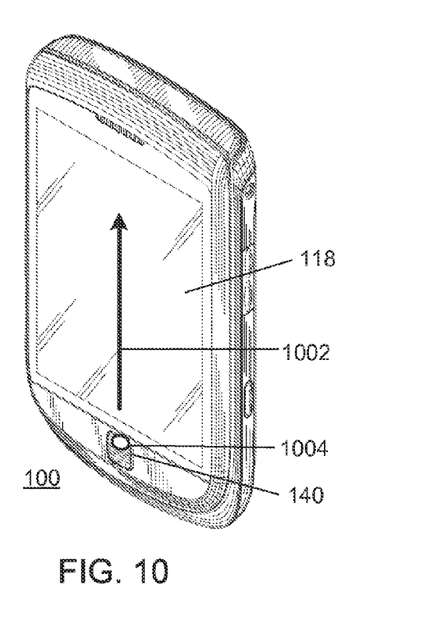

An example of a touch gesture on the touch-sensitive display 118 is illustrated by the arrow 1002 and extends to an input utilizing the navigation device 140 as illustrated by the ellipse 1004 in FIG. 10. The touch on the touch-sensitive display 118 extends more than half the length of the touch-sensitive display 118. Input from the navigation device 140 was received within 15 ms after detecting the touch that is in the direction of the navigation device 140. A function associated with the touch is performed. A function associated with the input is not performed.

Figure 11:
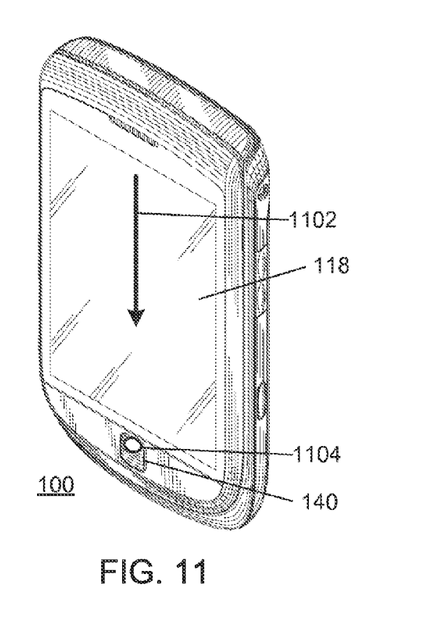

An example of a touch gesture on the touch-sensitive display 118 is illustrated by the arrow 1102, and an input utilizing the navigation device 140 is illustrated by the ellipse 1104 in FIG. 11. The touch on the touch-sensitive display 118 is not near the navigation device 140, i.e., beyond the threshold distance, and functions associated with both the touch and the input are performed.

The above-described process may be carried out in any suitable application. Optionally, the process may be selectively utilized in applications such that the process is not active for applications for which very quick response time to touches on the touch-sensitive display is desired. The process may also be activated or inactivated by selection or toggling of an option in a menu or submenu.

A touch-sensitive display that is located close to a navigation device may be inadvertently touched during use of the navigation device, and the navigation device may be inadvertently touched during use of the touch-sensitive display. Performing functions in response to inadvertent touches may result in corrective action that utilizes further device time and additional power, and may result in user frustration or dissatisfaction. Filtering out or eliminating touches based on touch location, timing relative to navigation device input, direction of navigation device input, and so forth, may reduce device use time, reduce power requirements, and improve the user interface.

A method includes detecting a touch at a location on a touch-sensitive display, receiving an input by a navigation device, and performing a function associated with at least one of the touch and the input in response to elapsing of a time period between detecting the touch and receiving the input.

An electronic device includes a touch-sensitive display, a navigation device, and a processor operably coupled to detect a touch at a location on the touch-sensitive display, receive an input from a navigation device, and perform a function associated with at least one of the touch and the input in response to elapsing of a time period between detecting the touch and receiving the input.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   detecting a touch at a location on a touch-sensitive display;
   receiving an input by a navigation device spaced from the touch-sensitive display;
   determining a time between detecting the touch and receiving the input;
   performing a first function associated with the touch and a second function associated with the input in response to determining that the time between detecting the touch and receiving the input is not within a predetermined time period;
   in response to determining that the time between detecting the touch and receiving the input is within the predetermined time period:
      performing one of the first function associated with the touch and the second function associated with the input; and determining whether to perform an other of the first function associated with the touch and the second function associated with the input based at least in part on:
  an order of detecting the touch and receiving the input; and
  a direction of one of the touch and the input.

2. The method according to claim 1, wherein the input comprises a scrolling input at the navigation device.

3. The method according to claim 1, wherein the first function and the second function are performed in response to determining that the location is outside a predetermined area of the touch-sensitive display.

4. The method according to claim 1, wherein the first function and the second function are performed in response to determining that the location is not within a predetermined distance of the navigation device.

5. The method according to claim 1, comprising starting a timer to determine the time between detecting the touch and receiving the input.

6. The method according to claim 1, wherein the second function associated with the input is performed when the touch on the touch-sensitive display is not a moving touch.

7. The method according to claim 1, wherein determining whether to perform an other of the first function associated with the touch and the second function associated with the input is also based on the location of the touch on the touch-sensitive display.

8. A non-transitory computer-readable storage device having computer-readable code executable by at least one processor of a portable electronic device to perform the method according to claim 1.

9. A portable electronic device comprising:
a touch-sensitive display;
a navigation device spaced from the touch-sensitive display;
a processor operably coupled to detect a touch at a location on the touch-sensitive display, receive an input from a navigation device, determine a time between detecting the touch and receiving the input, and perform a first function associated with the touch and a second function associated with the input in response to determining that the time between detecting the touch and receiving the input is not within a predetermined time period,
wherein, when the time between detecting the touch and receiving the input is within the predetermined time period, one of the first function associated with the touch and the second function associated with the input is performed and the processor determines whether to perform an other of the first function associated with the touch and the second function associated with the input based at least in part on an order of detecting the touch and receiving the input and a direction of one of the touch and the input.

10. The portable electronic device according to claim 9, wherein the determination whether to perform the other of the first function associated with the touch and the second function associated with the input is also based on the location of the touch on the touch-sensitive display.

11. The portable electronic device according to claim 9, wherein the navigation device comprises a device utilized to receive input to navigate through information, control a cursor, edit information, or any combination thereof.

* * * * *